United States Patent [19]

Abdullaev et al.

[11] 4,403,631
[45] Sep. 13, 1983

[54] FLEXIBLE PIPE

[76] Inventors: Gasan M. B. O. Abdullaev, ulitsa Saraikina, 27, blok 2, kv. 18; Faramaz G. O. Maxudov, ulitsa Gadzhibekova, 33/35, kv. 29; Dzhangir A. K. O. Kasimov, ulitsa Gadzhibekova, 38, kv. 39; Bakhtiyar M. R. O. Mamedov, prospekt Neftyanikov, 87, kv. 15; Gabil G. Aliev, ulitsa Gadzhieva, 42, blok 1, kv. 1; Yashar A. O. Gadzhiev, 4 mikroraion, ulitsa 7-ya Binagadinskaya, 9, kv. 9; Rovshan I. O. Shakhmamedov, ulitsa Gubanova, 10, kv. 8, all of Baku; Alexei A. Iljushin, Chistyo prudy, 9, kv. 44, Moscow, all of U.S.S.R.

[21] Appl. No.: 261,206

[22] PCT Filed: Sep. 1, 1980

[86] PCT No.: PCT/SU80/00153
§ 371 Date: May 12, 1981
§ 102(e) Date: May 6, 1981

[87] PCT Pub. No.: WO81/00746
PCT Pub. Date: Mar. 19, 1981

[51] Int. Cl.³ .............................................. F16L 9/16
[52] U.S. Cl. ..................................... 138/130; 138/132; 138/133; 138/134
[58] Field of Search ............... 138/129, 130, 132, 133, 138/134, 135, 144, 154, 172, 174

[56] References Cited
U.S. PATENT DOCUMENTS 1,068,553  7/1913  Abell et al. ...................... 138/135
1,692,529 11/1928  Zagorski ....................... 138/134 X
2,742,931  4/1956  De Ganahl ..................... 138/130 X
4,019,539  8/1977  Hoffmann et al. ............. 138/130 X

FOREIGN PATENT DOCUMENTS 2142764 12/1973  France .
2229538 12/1974  France ........................... 138/130
7901298  2/1979  Netherlands .................. 138/130
 668625  6/1979  U.S.S.R. .

Primary Examiner—James E. Bryant, III
Attorney, Agent, or Firm—Steinberg & Raskin

[57] ABSTRACT

A flexible pipe comprises an inner supporting pipe (1) made from an elastic material, onto which inner supporting pipe a shaped strip (2) is wound. Said strip (2) has a cross-section profile formed by two stepwise conjugated quadrangular flanges (3) and (4), the height of each of the flanges being equal to a half of the height of the profile. The adjacent turns of the strip (2) partially overlap each other so that the upper flange (3) of one turn is superimposed onto the lower flange (4) of the other flange, and the ends of the flanges (3) and (4) are aligned. An interlayer (5) made from an elastic material is superimposed onto the power frame formed by the strip (2). At least one pair of reinforcing layers (6) and (7) formed by groups of power filaments (8) and (9) is disposed on said interlayer (5), said filaments being parallel to one another and wound in contrary at angles of from 0 to 20° to the axis of the pipe. A protective shell (10 made from an elastic material is superimposed onto the pair of the reinforcing layers (8) and (9).

A method of manufacturing a modification of a flexible pipe having an interlayer (5) with a helical expansion (15 ) comprises the steps of: superimposing a shaped strip (2) onto the inner supporting pipe (1). Said strip (2) is fixed to the supporting pipe (1), whereupon the pipe is stretched along the axis thereof. Then the power frame formed by the strip (2) is covered with the interlayer (5) from an elastic material and fixed to the strip (2). Thereafter, the reinforcing layers (6) and (7) are wound, the protective shell is superimposed thereon, and the supporting pipe (1) is released from the action of the axial tensile load.

8 Claims, 11 Drawing Figures

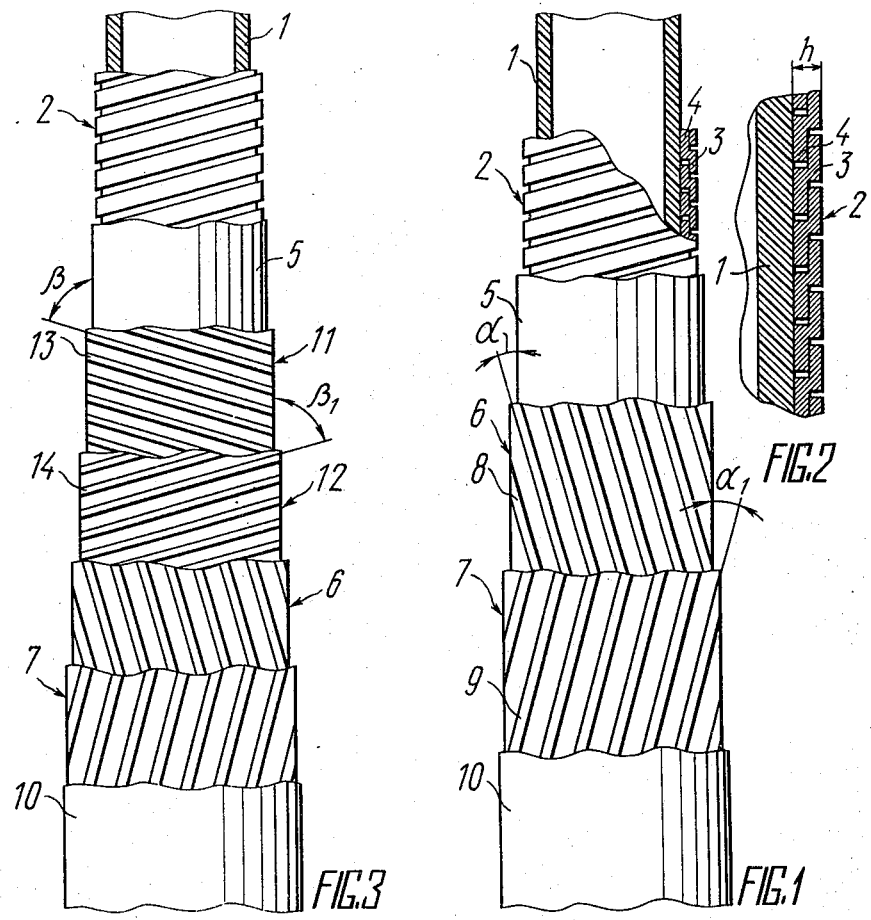

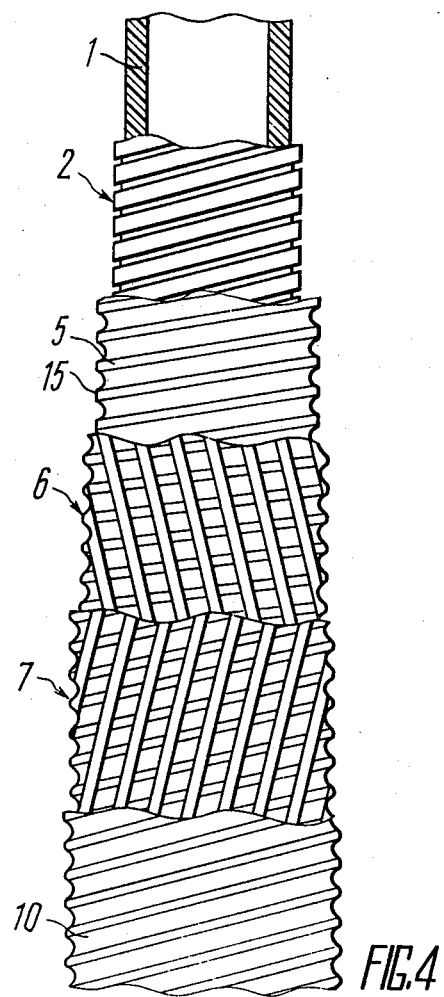
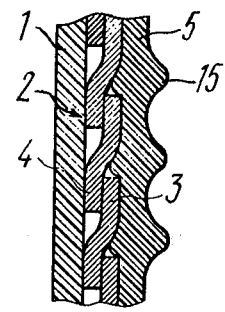
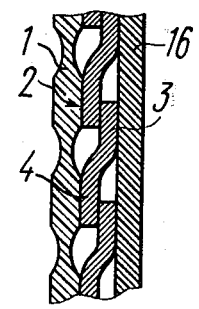

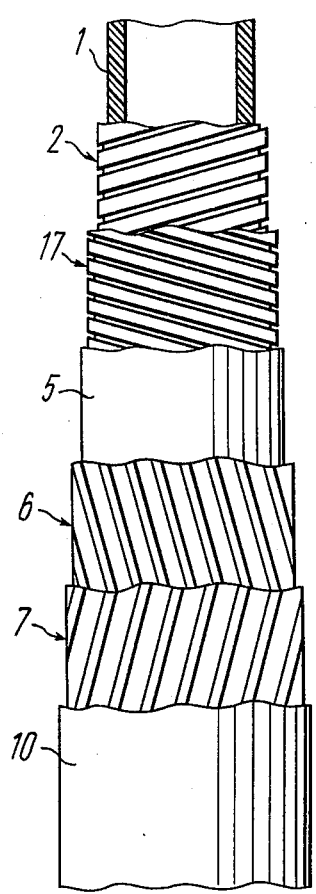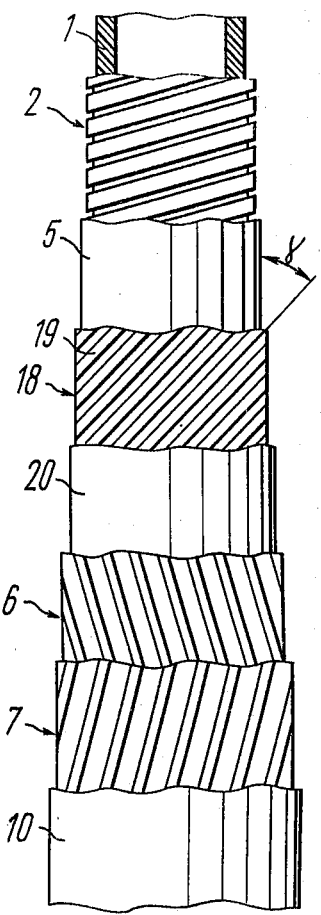

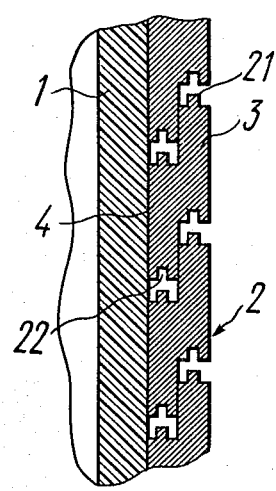
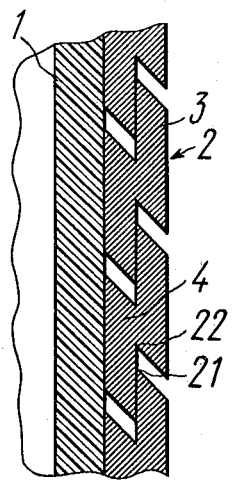
FIG.9  FIG.10
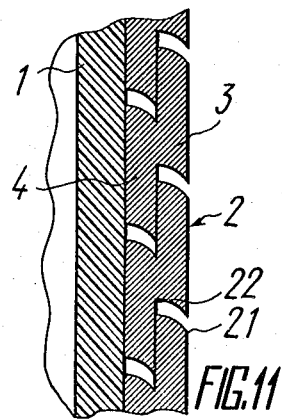
FIG.11

FLEXIBLE PIPE

TECHNICAL FIELD

The present invention relates to the design of machine components, namely to flexible pipes and to methods of making same.

The inventive flexible pipe may prove most advantageous in feeding working media under conditions characterized by the effect of increased internal and external loads, e.g. in petroleum, gas, coal, and chemical branches of industry as well as in aerospace technology and in offshore hydraulic structures.

Among the above loads are primarily an axial force, gage internal or external pressure, and torque. It is important that a flexible pipe does not change its cross-section shape, preserve its flexibility under the action of such loads, and be light, simple and cheap in manufacture.

The problem of developing such flexible pipes had become urgent comparatively long time ago in aeronautics and in offshore technology. Attention is being given to this problem recently as a result of carrying out space experiments and developing the continental shelf.

Analysis of prior art technical solutions demonstrates that this problem has not been satisfactorily solved up to now.

BACKGROUND ART

Known in the art is a flexible pipe whose design makes it possible to transmit working media under increased pressure and at the same time to receive an axial tensile force (French Pat. No. 2,142,764). Said flexible pipe comprises a rubber supporting pipe onto which pipe several layers of metal braid are wound in spiral. The lowest layer and the uppermost layer are wound with a shift in the winding angles of from 6° to 80°. Metal wires in all the layers are subject to tension and allow the flexible pipe cross-section to be preserved at a slight bending thereof under conditions of simultaneous influence of gage internal pressure and a slight axial tensile force.

However, such a flexible pipe cannot be applied in the case of effect of distributed or local external load, e.g. under the influence of gage external pressure. Under the effect of compression in the radial direction, the cross-section of the flexible pipe loses its stability due to the fact that the metal wires constituting the braid cannot resist this effect.

Also known in the art is a flexible pipe which is intended to receive, without deformation, apart from gage internal pressure and an axial tensile force, gage external pressure (USSR Inventor's Certificate No. 668,625). In accordance with the above disclosure, this flexible pipe comprises an inner supporting pipe constructed from an elastic material onto which pipe a flat strip from a rigid material (e.g. metal) is wound. The above strip forms a cylindrical power casing with an interlayer from an elastic material being put thereupon. Two layers of shaped rods are wound in crossed directions onto said interlayer. The cross-section of each rod has a maximum size in the radial direction. Said rods are wound symmetrically at angles of up to 40°.

Undoubtedly, the presence of the rods wound at such angles will allow the flexible pipe to receive an axial tensile force and gage internal pressure without fracture. However, if such a flexible pipe is placed into a medium whose pressure exceeds the pressure within the flexible pipe, the deformation of the flexible pipe becomes possible even at the pressure drop of 4 to 5 kg/cm$^2$, said deformation being accompanied by the loss in stability of its cross-section. This is due to the fact that the pressure of the external medium is freely transmitted through the gaps between the shaped rods (especially under tension) to the interlayer made from an elastic material and, correspondingly, to the power frame formed by the flat strip. The rigidity of this frame in the radial direction is low and is in no way reinforced by the shaped rods which are by themselves subject only to tension. Thus, the power frame, after having lost its stability, will be locally pressed into the flexible pipe. Simultaneously, the turns of the flat strip will separate, and the tightness of the flexible pipe will be certainly upset. Naturally, the above shortcomings will take place only at differentials in internal and external pressure of more than 4 to 5 kg/cm$^2$.

To our opinion, the most successful is a construction of a flexible pipe developed by the company "Coflexip S.A." (see advertising brochure "Coflexip Flexible Pipe for the Offshore Industry" by this company, published in 1979). The above flexible pipe comprises an inner supporting pipe constructed from an elastic material, a shaped strip having a Z-shaped cross-section and wound in a spiral onto said pipe. The Z-shaped cross-section of the strip is formed by two stepwise conjugated parallel flanges. The upper and the lower flanges are conjugated therebetween by means of a leg. Each flange is constructed in the form of an angle and rests by the edge of this angle on the opposite flange of the next turn of the strip. Thickness of each flange is substantially less (5 to 10 times) than the height of the strip profile. The above design is substantially one of modifications of the invention of a S-shaped profile. Thus, said angles of adjacent turns of a strip are put into engagement and limit the possibility of extending the power frame formed by the strip, in the axial direction. An interlayer of an elastic material is superimposed onto the power frame formed by a shaped strip. On the interlayer, there is provided at least one pair of reinforcing layers formed by groups of power filaments, said groups being parallel to one another, and wound substantially in a symmetrical position. The power filaments are provided in the form of steel wires and are wound at angles of 40° to 60° to the axis of the flexible pipe. The flexible pipe is also provided with an external protective shell made from an elastic material.

An obvious advantage of the above described construction of the flexible pipe consists in that such a design makes it possible to receive three types of loads: an axial tensile force, gage internal pressure, and gage external pressure. A sufficiently good perception of the gage external pressure is promoted by the fact that the strip forming the power frame is made in the shaped form, and all the structure of the flexible pipe is hermetically sealed by the external protective shell. While possessing the above advantages, the flexible pipe can maintain its flexibility.

Nevertheless, in the manufacture of such a flexible pipe it is necessary to utilize such expensive and high quality materials as alloy steels, titanium etc. Such a need is caused by the following considerations: a comparatively small thickness of flanges is required to provide for reliable engagement between the angles thereof because with the above mentioned angles of winding the power filaments, the latter do not ensure the complete perception of the total axial tensile force. Therefore, to avoid distortion of uniformity of the power frame (i.e. to eliminate the possibility of formation of through gaps between the strip turns under tension), the presence of engaging angles is necessary. For this reason, and also due to a rather complex technology of strip shaping, reinforcement of said strip by increasing the thickness of the flanges is impracticable. Moreover, the upper flange of each turn of the strip rests on the lower flange of the adjacent turn with a comparatively narrow edge of the angle. Consequently, the material from which the shaped strip is constructed, must possess high physico-mechanical properties, including high hardness among them. It will be understood that in order to reinforce the power frame, the power filaments of the reinforcing layers are also to be constructed from a high-strength steel wire. It should be also noted that the strength of the power frame receiving a portion of the axial tensile force is determined essentially by the strength of the weakest joint between two adjacent turns of the strip. The above consideration imposes especially high demands upon the production process of the shaped strip and the frame.

DISCLOSURE OF THE INVENTION

The principal object of the present invention is to provide a hose in which the structure of reinforcing layers and the construction of a frame allow inexpensive materials to be used for the manufacture of the same hose without reducing its strength. The object set forth is attained by that in the flexible pipe comprising an inner supporting pipe made from an elastic material; a power frame formed by a shaped strip having a Z-shaped cross-section with two stepwise conjugated flanges, the strip being wound in a spiral fashion onto the supporting pipe in such a way that the upper flange of each turn is disposed over the lower flange of the adjacent turn, an interlayer made from an elastic material and superimposed onto the power frame, at least one pair of reinforcing layers formed by groups of power filaments, said filaments being parallel to one another and wound in contrary onto said interlayer; and an external protective shell made from an elastic material, according to the invention, each of said flanges is of a quadrangular cross-section and is of a height equal to one half of the height of the profile of the strip so that the upper flange of each turn rests directly on the lower flange of the adjacent turn, and the ends of the upper flanges as well as the ends of the lower flanges are aligned, the power filaments of each reinforcing layer being wound at angles of from 0° to 20° to the axis of the pipe.

It turned out that with such a construction of the flexible pipe all the axial tensile force is received by the power filaments constituting the reinforcing layers. Therefore, there is no need in any angles engaging the turns of the shaped strip and limiting mutual displacement of these turns in the axial direction. Thus, elimination of the effect of the axial tensile load upon the power frame made it possible to get rid of the most vulnerable link represented by the angles engaging the turns of the strip therebetween. This has resulted in a considerable simplification of the production process of the shaped strip and has provided for a possibility of manufacturing said strip from such inexpensive materials as low-carbon structural and tool steels. Consequently, there are no conditions for the local wear of the strip as it took place in the prior art construction. The same factor makes it possible to substantially lower such a requirement placed upon the material as hardness thereof. Combination of the above characteristics makes it possible to increase durability and reliability of the flexible pipe, and to considerably lower its cost.

In the construction of a flexible pipe intended for operation under conditions of constant effect of the dynamic axial tensile load, the interlayer from an elastic material is expedient to have a helical expansion disposed above the butt formed between the ends of the upper flanges of the strip turns.

With sudden application of the axial tensile force, the supporting pipe and the interlayer are deformed first, the helical expansion is straightened out, and only then the power filaments get strained and come into operation.

For operation at very large depths, such a modification of the flexible pipe is advisable wherein between the power frame and the lower reinforcing layer of the power filaments wound at angles of 0° to 20°, there is provided at least one layer of a similar shaped strip wound in the opposite direction.

A modification of the flexible pipe is preferred, wherein between the interlayer from an elastic material and a pair of reinforcing layers of the power filaments wound at angles of 0° to 20°, there is provided a layer formed by the power filaments wound at an angle of 30° to 60° to the axis of the flexible pipe.

It turned out that with such a construction the flexible pipe can receive a torque and an axial compression force. Rigidity of the flexible pipe is proportional to the magnitude of the torque. Power filaments wound at an angle of 30° to 60° increase their angle of winding under the effect of such loads and squeeze the power frame while shifting the turns of the strip and thereby making said frame rigid and strong.

To ensure joint operation of all the layers and to eliminate the possibility of wearing-through the power filaments, it is expedient that the layer formed by said power filaments wound at an angle of 30° to 60° be closed by an additional interlayer from an elastic material.

The widest performance possibilities has a modification of the flexible pipe wherein on the ends of the flanges of the shaped strip there are provided longitudinal projections and grooves being congruent thereto, into which grooves said projections enter when the turns of the strip are brought together. Such a flexible pipe possesses flexibility both in unloaded state and under the effect of an axial tensile load. However, under the effect either of an axial compression force, or of a torque, the flexible pipe is transformed into a rigid pipe. The projections and the grooves provided at the ends of the flanges, ensure reliable engagement between the turns.

It is expedient that the flanges forming the profile of the strip cross-section, have a form of parallelograms. In this case the ends of the flanges in the strip turns have a conical shape, thereby ensuring self-alignment of the turns being brought together.

The same effect is achieved in a modification of the flexible pipe wherein the ends of the flanges having the cross-section in the form of a parallelogram, are rounded and have similar curvature radii. Roundings of the ends impart the flexible pipe an increased flexibility in the unloaded state.

The object set forth is also attained by that there is provided a method for manufacturing a flexible pipe, comprising the steps of superimposing a shaped strip preliminarily bent in a spiral, onto an inner supporting pipe, covering the power frame formed by the shaped strip, with an interlayer from an elastic material with simultaneous fastening said interlayer to the strip; winding reinforcing layers, and superimposing an external protective shell, wherein, according to the invention, prior to covering the power frame with the interlayer, the internal supporting pipe is fixed to the shaped strip, stretched along the axis thereof, and after superimposing the external protective shell is released from the action of the axial tensile load.

This makes it possible to wind reinforcing layers onto a smooth cylindrical surface of a blank of the interlayer, while the spiral expansion on said interlayer is formed after releasing the supporting pipe the axial tensile force.

It should be noted that the supporting pipe is returned into the initial state without formation of any crimps or wrinkles on the surface thereof.

BRIEF DESCRIPTION OF DRAWINGS

The invention is further explained in more detail in terms of description of the flexible pipe and a process for manufacturing same with reference to the accompanying drawings, in which:

FIG. 1 shows the flexible pipe of the present invention in a partial axial cross-section;

FIG. 2 shows a cross-sectional view of a fragment of the supporting pipe and the power frame formed by the shaped strip;

FIG. 3 shows a modification of the flexible pipe, reinforced to receive an internal gage pressure;

FIG. 4 shows a modification of the flexible pipe provided according to the invention with a shaped elastic interlayer;

FIG. 5 shows an axial cross-sectional view of a fragment of the supporting pipe, the power frame and the shaped interlayer in a stretched state prior to vulcanization;

FIG. 6 shows the fragment illustrated in FIG. 5 when the flexible pipe is in a free state;

FIG. 7 shows a modification of the flexible pipe having a power frame formed according to the invention by two layers of shaped strips;

FIG. 8 shows a modification of the flexible pipe having according to the invention with an additional reinforcing layer;

FIG. 9 shows an enlarged fragment of the supporting pipe and of the shaped strip provided according to the invention with projections and grooves;

FIG. 10 shows a modification of the shaped strip provided with flanges having a cross-section in the form of a parallelogram according to the invention;

FIG. 11 shows a modification of the flexible pipe, similar to that illustrated in FIG. 11 but with rounded ends of the flanges according to the invention.

BEST MODE FOR CARRYING OUT THE INVENTION

The flexible pipe of the present invention comprises an inner supporting pipe 1 (FIG. 1) constructed from an elastic material. Such elastomers as rubbers, natural and synthetic rubbers, polyamides, polyurethane etc. can be utilized as the elastic material. A shaped strip 2 is wound in spiral onto the supporting pipe 1, said strip being constructed from a resilient material having a modulus of elasticity within the range of $6 \times 10^4$ to $4 \times 5 \times 10^6$ kg/cm$^2$. In particular, the strip 2 can be constructed from metals and alloys thereof, and from some rigid plastics such as polypropylene etc.

The shaped strip 2 is wound at an angle to the axis of the flexible pipe, which angle is within the range of 60° to 85°. The strip 2 has a Z-shaped cross-sectional configuration formed by two stepwise conjugated flanges 3 and 4 being of a quadrangular cross-section. The height of each of the flanges 3 and 4 is equal to one half the height h of the profile of the strip 2 (FIG. 2). The shaped strip 2 is wound in such a manner that adjacent turns partially overlap one another as it can be seen in FIGS. 1 and 2 of the accompanying drawings. The upper flange 3 of each turn of the strip 2 rests on the lower flange 4 of the adjacent turn of the strip 2. The ends of the upper flanges 3 as well as the ends of the lower flanges 4 of the adjacent turns of the strip 2 are aligned. Thus, spirally wound shaped strip 2 forms a cylindrical power frame allowing the flexible pipe to preserve its cross-sectional shape when bending, and also under the effect of considerable radial loads, e.g. internal or external gage pressure.

An interlayer 5 constructed from an elastic material is superimposed onto the power frame formed by the shaped strip 2. Onto the interlayer 5 there is wound at least one pair of reinforcing layers 6 and 7. The reinforcing layer 6 is formed by a group of power filaments 8 which are parallel to one another. The power filaments 8 are wound at an angle $\alpha$ to the axis of the flexible pipe. The angle $\alpha$ is selected within the range of 0° to 20°. The second reinforcing layer 7 is wound in the counter direction to the layer 6. This layer 7 is formed by a group of power filaments 9 which are parallel to one another. The power filaments 9 are wound at an angle $\alpha_1$ to the axis of the flexible pipe. The angle $\alpha_1$ is equal to the angle $\alpha$ and is also selected within the range of 0° to 20°.

An external protective shell 10 is superimposed onto the reinforcing layer 7. Said shell 10 is constructed from an elastic material.

It will be understood that apart from the above described components, the inventive flexible pipe may comprise other flexible reinforcing components as well. The number of the reinforcing layers is also unlimited. For example, FIG. 3 illustrates a modification of the flexible pipe which is reinforced to receive internal gage pressure. According to this modification, between the interlayer 5 and the reinforcing layer 6 there are symmetrically wound two additional reinforcing layers 11 and 12. The additional reinforcing layers 11 and 12 are formed by respective groups of power filaments, 13 and 14 respectively, the filaments of each group being parallel to one another. The power filaments 13 and 14 are wound at angles $\beta$ and $\beta_1$ to the axis of the flexible pipe. The values of the angles $\beta$ and $\beta_1$ are equal to one another and are selected within the range of 75° to 90°.

The interlayer 5 superimposed onto the shaped strip 2, can be of a constant thickness over the whole length of the flexible pipe. However, more preferred is a modification of the flexible pipe illustrated in FIG. 4. According to this modification, the interlayer 5 constructed from an elastic material, has a helical expansion 15 disposed above the butt or gap between the adjacent ends of the upper flanges 3 of the adjacent turns of the shaped strip 2.

In FIG. 6 of the accompanying drawings the shape of the expansion 15 of the interlayer 5 and location of said expansion are shown in more detail.

In the process of developing the given modification, it appeared that with prior art methods it is impossible to provide a spiral expansion 15 on the elastic interlayer 5, said expansion being located exactly over the butt or gap between the adjacent ends of the upper flanges 3 of the strip 2. It should be also noted that even a slight shift of the expansion 15 relative to the butt will offset the effect obtained with the help of said expansion. Moreover, it is impracticable to uniformly wind the power filaments 8 and 9 (FIG. 4) onto the interlayer 5 provided with the expansion 15. For this reason, there has been concurrently developed a method of manufacturing the modification of the flexible pipe illustrated in FIG. 4.

The method comprises the following consequently accomplished steps. According to the invention, a strip 2 which has been preliminarily bent in a spiral shape is put on the inner supporting pipe 1. Said strip 2 is secured to the supporting pipe 1 following which the supporting pipe 1 is stretched along the axis thereof. A tubular blank 16 constructed from an elastic material (FIG. 5) is superimposed onto the power frame formed by the shaped strip 2. The tubular blank 16 is fixed to the shaped strip 2. The walls of the tubular blank 16 are of a constant thickness over the whole length of the flexible pipe. The reinforcing layers 6 and 7 (FIG. 4) are wound onto the tubular blank 16. Following this, the protective external shell is superimposed, and the flexible pipe is heated to soften the elastic material, and to impart required mechanical properties to this material (e.g. to vulcanize rubber). Then the supporting pipe 1 and the power frame formed by the strip 2, are released from the effect of an axial tensile load. Under the action of resilient forces, the supporting pipe 1 and the power frame return to their initial state. The pitch of winding of the shaped strip 2 is reduced, thereby reducing gaps between the ends of its upper flanges 3. Thus, the tubular blank 16 being rigidly connected with the strip 2 gets compressed and a spiral expansion 15 is formed thereon, said expansion filling the gap between the ends of the upper flanges 3 (FIG. 6 of the accompanying drawings). The spiral expansion 15 locates without fail exactly above the butt or gap between the ends of the upper flanges 3 of the turns of the strip 2.

The power frame can be formed not only by one layer of the shaped strip 2. The number of such layers may be two or more. If the power frame is formed by at least two layers of the shaped strips 2 and 17 (FIG. 7), the strips 2 and 17 are wound in opposite directions. If the power frame is formed by a greater number of layers, the layers in the adjacent layers are wound in opposite directions.

Now consider the modification of the flexible pipe illustrated in FIG. 8. As it can be seen in this figure, the given modification comprises all the elements of the flexible pipe shown in FIG. 1. The distinguishing feature of this modification consists in that a layer 18 is provided between the interlayer 5 and the pair of reinforcing layers 6 and 7 of the power filaments 8 and 9. The layer 18 is formed by power filaments 19 which are parallel to one another and wound at an angle $\gamma$ to the axis of the flexible pipe. The angle $\gamma$ is selected within the range of 30° to 60°. Said layer 18, according to the invention, is closed by an additional interlayer 20 constructed from an elastic material, the reinforcing layer 6 being wound directly onto said interlayer.

The modification of the flexible pipe shown in FIG. 9 possesses the widest performance possibilities. According to this modification, on the ends of the flanges 3 and 4 of the shaped strip 2, there are provided longitudinal projections 21 and grooves 22 being congruent thereto. It will be understood that both the projection 21 and the groove 22 can be of various cross-sections (e.g. rectangular). The main condition determining the shape of the cross-section either of the projection 21 or of the groove 22, is the provision of the possibility of free entry of the projections 21 into the grooves 22 when the turns of the shaped strip 2 are brought together.

The same possibility is ensured by the modification of the shaped strip 2 illustrated in FIG. 10. In accordance with this modification, the upper flanges 3 and the lower flanges 4 forming the profile of the cross-section of the strip 2, have the form of a parallelogram. Thus, sharpened ends of the flanges 3 and 4 are substantially the projections 21, while the grooves 22 are defined by sharpened ends of the lower flanges 4 and by the supporting pipe 1, and also by sharpened ends of the upper flanges 3 and the surfaces of the lower flanges 4 being adjacent thereto.

The ends of the flanges 3 and 4 are not necessarily flat but can be also formed by curvilinear surfaces. For example, FIG. 11 illustrates the modification of the shaped strip 2 provided with rounded ends of the flanges 3 and 4. The flanges 3 and 4 have the form of parallelograms and are so constructed that the radii of curvature of their ends are equal one another.

In transportation of the working medium under the effect of internal and external loads, the above described flexible pipe operates as follows.

The modification of the flexible pipe shown in FIG. 1 of the accompanying drawings, can be utilized under conditions characterized by simultaneous or alternate effects of such factors as gage internal and external pressure, and an axial tensile load. Under such conditions, the flexible pipe preserves its flexibility both in working and in idle states. The axial tensile force is substantially received by the power filaments 8 and 9 of the reinforcing layers 6 and 7. The shape of the cross-section of the flexible pipe under the effect of gage external pressure and in bending, is preserved due to the presence of the power cylindrical frame formed by the shaped frame 2.

In bending the flexible pipe, the gap provided within the butt or gap between the upper flanges 3 is increased on one side of the flexible pipe, while on the other side said gap is reduced. That is, on the surface of a greater bending radius of the flexible pipe, the turns of the shaped strip 2 are brought apart (but continue to partially overlap one another), while on the surface of a smaller bending radius said turns are brought together. The power filaments 8 and 9 of the reinforcing layers 6 and 7 prevent an exceeding emergency increase in the gap within the butt between the upper flanges 3. Since these filaments 8 and 9 are wound at an angle from 0° to 20° to the axis of the flexible pipe, and are rather rigid in the axial direction, they provide for flexibility of the pipe while limiting the possibility of its elongation. Gage internal pressure is received by the supporting pipe 1, which pipe while being deformed, transmits this pressure to the power frame formed by the shaped strip 2. Since the power frame is covered with the reinforcing layers 6 and 7 of the power filaments 8 and 9, the flexible pipe preserves its cross-sectional shape.

The modification of the flexible pipe shown in FIG. 3 can withstand considerably greater gage internal pressure. In this case the major portion of the radial load occurring under the action of gage internal pressure is received by the power filaments 13 and 14 of the additional reinforcing layers 11 and 12.

The modification of the flexible pipe shown in FIG. 4 while preserving all the advantages of the above described modifications, allows dynamic loads (e.g. axial jerks, hydraulic impacts etc.) to be damped. In dynamic loading such a flexible pipe by an axial tensile force, at first the supporting pipe 1, the interlayer 5, and the external protective shell 10 constructed from an elastic material, start to become resiliently deformed. In the course of deformation, the energy of the axial loading is partially absorbed. As the process of axial deformation proceeds, the spiral expansion 15 of the interlayer 5 vanishes, the power filaments 8 and 9 straighten out and start receiving the major portion of the axial tensile load. Thus, the reinforcing layers 6 and 7 come into operation constantly under the dynamic axial load, thereby significantly increasing reliability and durability of the flexible pipe.

The modification of the flexible pipe shown in FIG. 7 operates substantially as above described under stretching, and under the action of internal and external gage pressure, though external or internal gage pressure is received successfully not only by the shaped strip 2, but also by a layer formed by an analogous shaped strip 17. The above consideration makes it possible to use the given modification of the flexible pipe under considerably more severe conditions, e.g. when operating at large depths.

The modification of the flexible pipe shown in FIG. 8 allows not only axial stretching, external and internal gage pressure to be received, but also compression in the axial direction, and a torque.

Consequently, the above modification of the flexible pipe is capable of preserving stability under the action of axial compression, i.e. it can present a rigid pipe and at the same time, be a flexible pipe in the absence of a torque and of an axial compression load. Such a feature is attained by the presence of a reinforcing layer 18 whose power filaments 19 are wound at an angle of 30° to 60° to the axis of the flexible pipe.

In the absence of an external load, availability of gaps between the adjacent edges of the upper flanges 3 of the shaped strip 2 provides for flexibility of the flexible pipe. Thus, the flexible pipe can be stored and shipped wound on a drum. When receiving internal and external gage pressure, and an axial tensile load, the above modification of the flexible pipe functions substantially as above described. When the flexible pipe is compressed in the axial direction, the upper flanges 3 of the turns of the shaped strip 2 are brought together, the gap between the flanges 3 disappears, and the angle of winding the power filaments 19 increases approaching the upper limit thereof, i.e. 60°. This results in that the flexible pipe transforms into a rigid structure. Similar compression of the flexible pipe in the axial direction also occurs when applying a torque thereto. Under the action of the torque, the angle of winding the power filaments 19 increases. The reinforcing layer 18 squeezes the power frame formed by the shaped strip 2, thereby promoting an increase in rigidity and stability thereof. It is apparent that the greater is the value of the torque, the higher is rigidity and stability of the flexible pipe.

The modification of the flexible pipe illustrated in FIGS. 9 through 11 of the accompanying drawings, possesses significantly higher rigidity and stability.

Under axial compression, and under the effect of a torque, the turns of the shaped strip 2 are brought together. The projections 21 enter the grooves 22, thereby limiting the freedom of relative displacement of the turns of the strip 2 in the radial direction. Thereby stability of the flexible pipe is substantially increased. The above advantages allow the given modification of the flexible pipe to be used as drilling pipes. Relative alignment of the turns of the shaped strip 2 under the action of axial compression is promoted by the shape of the flanges 3 and 4 illustrated in FIGS. 10 and 11. In these cases, the projections 21 and the grooves 22 have the form of a cone and that of a convex body of revolution, which factor will result in an inevitable alignment of the turns of the strip 2 when the above turns are brought together.

Industrial Applicability

The flexible pipe of the present invention can be used for feeding working media under conditions characterized by the effect of increased internal and external loads. Most advantageously the flexible pipe can be used in petroleum, gas, coal, and chemical branches of industry as well as in aerospace technology and in offshore hydraulic structures.

While the invention has been described herein in terms of specific embodiments thereof, numerous variations and modifications may be made in the invention without departing from the invention as set forth in the appended claims.

We claim:

1. In a flexible pipe comprising an inner supporting pipe made from an elastic material; a power frame formed by a shaped strip having a Z-shaped cross-sectional profile with two stepwise conjugated flanges, the strip being wound in a spiral fashion onto the supporting pipe such that the upper flange of each turn is disposed over the lower flange of the adjacent turn, an interlayer formed of an elastic material and superimposed onto the power frame, at least one pair of reinforcing layers including an upper and a lower reinforcing layer, said reinforcing layers being formed by groups of power filaments, said filaments being parallel to one another and wound in opposed directions onto said interlayer, and an external protective shell formed of an elastic material, the improvement comprising, each of said flanges is of a quadrangular cross-section and is of a height equal to one half of the height of the profile of the strip so that the upper flange of each turn rests directly on the lower flange of the adjacent turn, and the ends of the upper flanges as well as the ends of the lower flanges are aligned, the power filaments of each reinforcing layer being wound at angles of from about 0° to 20° to the axis of the pipe.

2. A flexible pipe as claimed in claim 1, wherein said interlayer has a helical expansion disposed above a gap formed between the ends of the upper flanges of the turns of the strip.

3. A flexible pipe as claimed in claim 1, wherein between the power frame and the lower reinforcing layer of the power filaments wound at an angle of 0° to 20°, there is provided at least one layer of a shaped strip wound in the opposite direction.

4. A flexible pipe as claimed in claim 1, wherein between said interlayer and the pair of reinforcing layers of the power filaments wound at an angle of 0° to 20°, there is provided a layer formed by power filaments wound at an angle of about 30° to 60° to the axis of the flexible pipe.

5. A flexible pipe as claimed in claim 4, wherein said layer formed by the power filaments wound at an angle of 30° to 60° is closed by an additional interlayer formed of an elastic material.

6. A flexible pipe as claimed in claim 4 wherein on the ends of the flanges of the shaped strip, there are provided longitudinal projections and grooves being congruent thereto, into which grooves said projections enter when the turns of the strip are brought together.

7. A flexible pipe as claimed in claim 6, wherein the flanges forming the cross-sectional profile of the shaped strip have the form of parallelograms.

8. A flexible pipe as claimed in claim 7, wherein the ends of the flanges having a form of parallelograms, are rounded and have similar radii of curvature.

* * * * *